(12) United States Patent
Thomas et al.

(10) Patent No.: US 7,235,032 B2
(45) Date of Patent: Jun. 26, 2007

(54) MULTIPLE-SPEED AUTOMATIC TRANSMISSION HAVING A TWO-SPEED INPUT AND A SIMPSON GEARSET

(75) Inventors: Steve G. Thomas, Bloomfield Hills, MI (US); Donald E. Hoffman, Canton, MI (US); Gregory D. Goleski, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 199 days.

(21) Appl. No.: 11/203,704

(22) Filed: Aug. 15, 2005

(65) Prior Publication Data

US 2007/0037658 A1 Feb. 15, 2007

(51) Int. Cl.
*F16H 3/44* (2006.01)
(52) U.S. Cl. ...................... 475/284; 475/288
(58) Field of Classification Search ............... 475/284, 475/288
See application file for complete search history.

(56) References Cited

U.S. PATENT DOCUMENTS 5,106,352 A 4/1992 Lepelletier

| | | | |
|---|---|---|---|
| 5,951,432 A * | 9/1999 | Wehking et al. | 475/280 |
| 6,165,097 A * | 12/2000 | Hebbale et al. | 475/280 |
| 6,663,529 B1 | 12/2003 | Haka | |
| 6,786,845 B1 | 9/2004 | Haka | |
| 2003/0114266 A1 | 6/2003 | Bauer | |
| 2007/0037657 A1 * | 2/2007 | Thomas et al. | 475/284 |

FOREIGN PATENT DOCUMENTS

JP 2240433 9/1990

* cited by examiner

*Primary Examiner*—Dirk Wright
(74) *Attorney, Agent, or Firm*—David B. Kelley; MacMillan, Sobanski & Todd, LLC

(57) ABSTRACT

A multi-speed automatic transmission includes an input and output, first, second and three planetary gear units, each gear unit including a sun gear, a ring gear, planet pinions meshing with the sun gear and the ring gear, and a carrier rotatably supporting the planet pinions. A first brake alternately holds against rotation and releases the sun gear of the second gear unit and the sun gear of the third gear unit. A second brake alternately holds and releases the carrier of the second gear unit. A first clutch alternately connects and disconnects the carrier of the first gear unit and the ring gear of the third gear unit. A second clutch alternately disconnects and connects the carrier of the first gear unit to the sun gears of the second gear unit and third gear unit. A third clutch alternately releases and connects the input and ring gear of the first gear unit to the carrier of the second gear unit.

14 Claims, 2 Drawing Sheets

Figure 2

CONTROL ELEMENT SCHEDULE

|     | CLT_A 64 | CLT_B 66 | BRK_C 72 | BRK_D 74 | CLT_E 68 | RATIO  |
|-----|----------|----------|----------|----------|----------|--------|
| 1st | X        |          |          | X        |          | 4.172  |
| 2nd | X        |          | X        |          |          | 2.340  |
| 3rd | X        | X        |          |          |          | 1.521  |
| 4th | X        |          |          |          | X        | 1.143  |
| 5th |          | X        |          |          | X        | 0.867  |
| 6th |          |          | X        |          | X        | 0.691  |
| Rev |          | X        |          | X        |          | -3.403 |

Figure 3

| 32 | B1 | 1.919 |
| 34 | B2 | 2.237 |
| 36 | B3 | 1.857 |

MULTIPLE-SPEED AUTOMATIC TRANSMISSION HAVING A TWO-SPEED INPUT AND A SIMPSON GEARSET

BACKGROUND OF THE INVENTION

This invention relates to the field of automatic transmissions for motor vehicles. More particularly, the invention pertains to a kinematic arrangement of gearing, clutches, brakes, and the interconnections among them in such transmissions.

U.S. Pat. No. 5,106,352 describes a multi-speed automatic transmission for motor vehicles that includes two parallel gearsets providing two fixed speed ratios. The second speed ratio is higher than the first speed ratio. A first power path using the first fixed speed ratio includes a first control clutch and a second control clutch, and a second power path using the second fixed speed ratio includes a third control clutch. Several embodiments of the transmission include a double planetary gearset; other embodiments disclose a Ravigneaux gearset, a first control brake and a second control brake. Alternatively, the input shaft and output shaft are in alignment and one of the two speed ratios is a direct drive.

Experience in manufacturing Ravigneaux gearsets for automatic transmissions has shown that these gearsets tend to produce relatively high gear noise in comparison to simple planetary gearsets and Simpson gearsets. To minimize gear noise, extensive steps are taken during the manufacturing process to grind the gears. But these steps and the additional complexity associated with assembling Ravigneaux gearsets add cost to the transmission.

SUMMARY OF THE INVENTION

A transmission according to the present invention is compact and suited for either for front-wheel drive transverse engine applications or rear wheel drive vehicles longitudinal engine applications. The transmission includes a minimum number of friction elements and readily provides well spaced gear ratios. The transmission has inherently high design flexibility.

The embodiment of this invention described below produces six forward speeds, four underdrive gear ratios, two overdrive ratios, and one reverse gear ratio, yet it includes only two braking elements and three rotating clutches.

The transmission preferably includes a modified Simpson gear unit rather than a more complex Ravigneaux gearset, thereby reducing gear noise and eliminating the cost required to grind gears of a Ravigneaux gearset. In order to configure a Simpson gear unit to function like a Ravigneaux gearset, the first of the two new gearsets preferably includes two ring gears and a center web to allow engine torque to be transmitted to the carrier during operation in fourth and sixth gears.

It has been demonstrated that use of a Simpson gear unit results in lower gear mesh losses, particularly in first, second and fourth gears, compared to those of a transmission having a Ravigneaux gearset.

An automatic transmission according to the present invention includes an input and output, and three planetary gear units, each gear unit including a sun gear, a ring gear, planet pinions meshing with the sun gear and the ring gear, and a carrier rotatably supporting the planet pinions. A first brake alternately holds against rotation and releases the sun gear of the second gear unit and the sun gear of the third gear unit. A second brake alternately holds and releases the carrier of the second gear unit. A first clutch alternately connects and disconnects the carrier of the first gear unit and the ring gear of the third gear unit. A second clutch alternately disconnects and connects the carrier of the first gear unit to the sun gears of the second gear unit and third gear unit. A third clutch alternately releases and connects the input and ring gear of the first gear unit to the carrier of the second gear unit.

DESCRIPTION OF THE DRAWINGS

The above, as well as other advantages of the present invention will become readily apparent to those skilled in the art from the following detailed description of a preferred embodiment when considered in the light of the accompanying drawings in which:

FIG. 2 is chart showing for each forward and reverse speed the operating state of the clutches and brakes that control the transmission of FIG. 1, and a preferred speed ratio for each gear; and FIG. 3 is a chart that lists the ratio of the pitch diameters of the ring gear and sun gear for each gear unit.

DESCRIPTION OF THE PREFERRED EMBODIMENT

Figure 1:
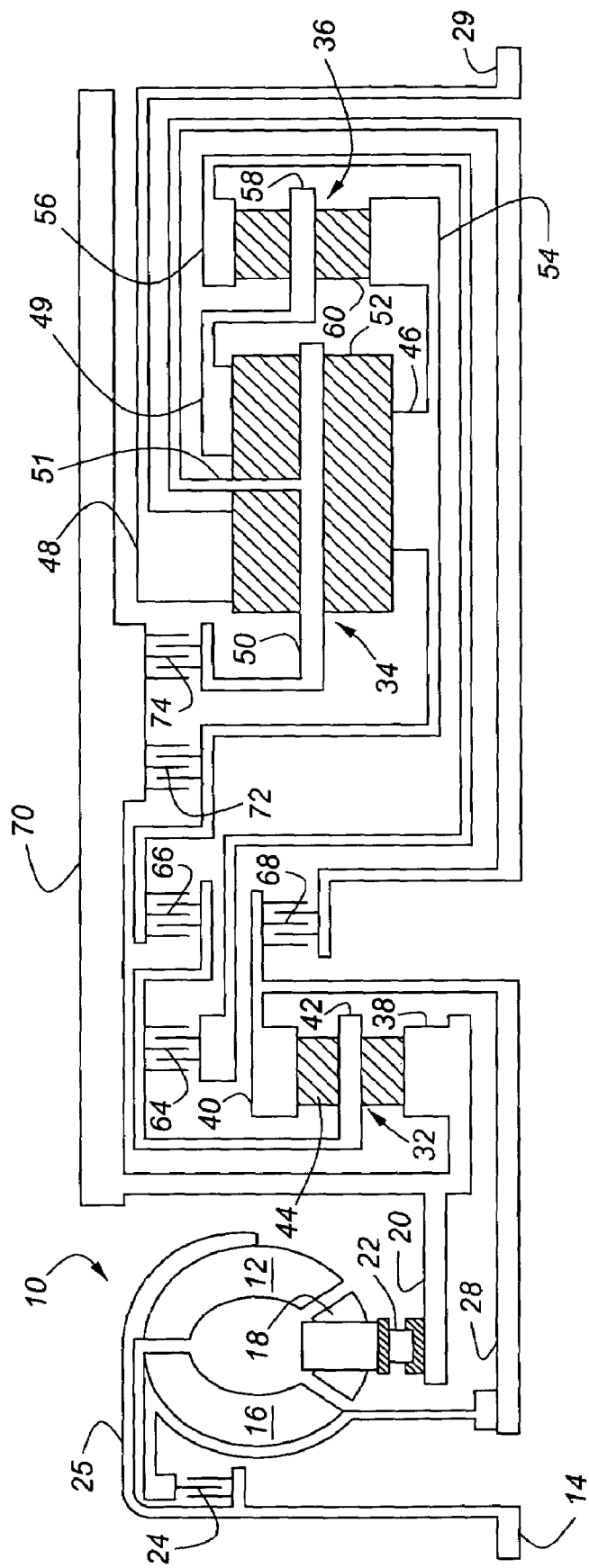
FIG. 1 is a schematic diagram illustrating the kinematic arrangement for a transmission according to the present invention.

Referring now to the drawings, there is illustrated in FIG. 1 the kinematic arrangement of an automatic transmission according to the present invention. A torque converter 10 includes an impeller wheel 12 connected to the crankshaft 14 of an internal combustion engine, a bladed turbine wheel 16, and a bladed stator wheel 18. The impeller, stator and turbine wheels define a toroidal fluid flow circuit, whereby the impeller is hydrokinetically connected to the turbine. The stator 18 is supported rotatably on a stationary stator sleeve shaft 20, and an overrunning brake 22 anchors the stator to the shaft 20 to prevent rotation of the stator in a direction opposite the direction of rotation of the impeller, although free-wheeling motion in the opposite direction is permitted.

The torque converter includes a lockup clutch 24 located within the torque converter impeller housing 25. When clutch 24 is engaged, the turbine and impeller are mechanically connected to a transmission input shaft 28; when clutch 24 is disengaged, the turbine and impeller are hydrokinetically connected and mechanically disconnected. Fluid contained in the torque converter is supplied to the torque converter from the output of an oil pump assembly (not shown) and is returned to an oil sump, to which an inlet of the pump is connected hydraulically.

A planetary gear system includes first, second, and third gear units 32, 34, and 36. The first gear unit 32 includes a sun gear 38, ring gear 40, carrier 42, and planetary pinions 44, supported on carrier 42 in meshing engagement with sun gear 38 and ring gear 40.

The second gear unit 34 includes a sun gear 46, axially spaced first and second ring gears 48, 49, carrier 50, and planetary pinions 52, rotatably supported on carrier 50 in meshing engagement with sun gear 46 and ring gears 48, 49. A member 51, secured to carrier 50 and extending radially between the first ring gear 48 and second ring gear 49, is driveably connected to the input 28 through a clutch 68. In this way, carrier 50 is accessible to the input 28, and the first ring gear 48 is secured to the output 29 for rotation therewith without interference.

The third gear unit 36 includes a sun gear 54, ring gear 56, carrier 58, and planetary pinions 60, rotatably supported on carrier 58 in meshing engagement with sun gear 54 and ring gear 56.

The sun gear 38 of the first gear unit 32 is fixed against rotation. The ring gear 40 of the first gear unit 32 is driveably connected to the input 28. The first ring gear 48 of the second gear unit 34 is driveably connected to the output 29. The second ring gear 49 of the second gear unit 34 is driveably connected to the carrier 58 of the third gear unit 36. The sun gear 46 of the second gear unit 34 is secured to the sun gear 54 of the third gear unit 36.

Carrier 42 of the first gear unit 32 is continually driveably connected to clutches 64 and 66. Clutch 64 alternately driveably connects and disconnects carrier 42 and ring gear 56. Clutch 66 alternately driveably disconnects and connects carrier 42 to sun gears 46 and 54, which are secured mutually to rotate as a unit.

Carrier 50 of the second gear unit 34 is continually driveably connected to clutch 68, and input 28 and ring gear 40 are continually driveably connected to clutch 68. Clutch 68 alternately driveably connects and disconnects ring gear 40 and input 28, which are secured mutually to rotate as a unit, to carrier 50.

Sun gears 46, 54 are held against rotation preferably on a transmission case 70 upon engagement of a first friction brake 72, and those sun gears are released for free rotation upon disengagement of brake 72. Engagement of a second friction brake 74 holds carrier 50 against rotation on the transmission case 70; carrier 50 is released for free, independent rotation upon disengagement of brake 74.

Clutches 64, 66, 68 and brakes 72, 74, are preferably hydraulically-actuated friction devices having sets of interleaved friction discs and spacer plates, the discs being secured to one element of the clutch or brake, the spacer plates secured to another element of the clutch or brake. When hydraulic pressure increases in the cylinder of a servo that actuates a respective friction element, the discs and plates of the respective friction element are forced by displacement of the servo piston into mutual frictional contact, thereby producing a drive connection between the components of the gear units to which the elements of the clutch or brake are secured. When the pressure is vented from the servo cylinder, the clutch or brake is disengaged and the components are free to rotate independently. U.S. Pat. No. 4,943,921 describes and illustrates examples of hydraulically actuated friction clutches and brakes, which can be used in the transmission of this invention.

A first power path having a first fixed speed ratio, in the embodiment illustrated in FIG. 1 being less than unity, driveably connects the input 28 through the first gear unit to the ring gear 56 through clutch 64, and to the sun gears 46, 54 through clutch 66. A second power path having a second fixed speed ratio greater than the first fixed speed ratio driveably connects the input 28 through the first gear unit and clutch 68 to carrier 50. Alternatively the first planetary gear unit 32 may be replaced by a first layshaft gear set having a first pinion secured to input 28 and a first gear meshing with the pinion and connected to the first clutch 64 and second clutch 66, and a second layshaft gear set having a second pinion secured to input 28 and a second gear meshing with the second pinion and connected to the third clutch 68 such that the speed ratio of the second layshaft gear set is greater than the speed ratio produced by the first layshaft gear set.

Operation of the transmission is described next with reference to the engaged and disengaged state of the friction elements, which states in combination produce each of the gear ratios. Preferably, the states of the clutches and brakes are changed automatically in accordance with execution of a control algorithm by an electronic transmission controller. FIG. 2 is a chart indicating the state of engagement and disengagement of the clutches and brakes corresponding to each the gear ratios. In the chart, symbol "X" identifies an engaged friction clutch and friction brake. A blank indicates that the corresponding clutch and brake is disengaged or released.

FIG. 2 is chart showing for each forward and reverse speed the operating state of the clutches and brakes that control the transmission of FIG. 1 and the speed ratio of the respective gear. FIG. 3 is a chart that lists the ratio (R/S) of the pitch diameters of the ring gear and sun gear for each gear unit. That ratio is referred to as beta or $\beta$.

The transmission operates in the first forward gear when clutch 64 and brake 74 are engaged concurrently. With sun gear 38 held against rotation and ring gear 40 driven at the speed of input 28, the speed of the carrier 42 of the first gear unit 32 is equal to the speed of input 28 divided by $[1+(1/\beta_1]$, wherein $\beta_1 = (R/S)_1$ the ratio of the pitch diameters of ring gear 40 and sun gear 38. The speed of carrier 42 is therefore 0.6574 times the speed of input 28. Brake 74 holds carrier 50 against rotation and produces a torque reaction on the transmission case 70. The speed of output 29 and ring gear 48 are underdriven relative to the speed of carrier 42. With the transmission operating in first gear, the ratio of the speed of input 28 and the speed of output 29 is 4.172. As FIG. 2 shows, the transmission operates in each of the four lowest forward gears when clutch 64 is engaged; therefore, in each of the four lowest gears, the speed of ring gear 56 is 0.6574 times the speed of input 28.

An upshift to the second speed ratio results by maintaining clutch 64 engaged, engaging brake 72, and disengaging brake 74. Sun gears 46 and 54 are fixed against rotation due to the engagement of brake 72. Ring gear is underdriven relative to the speed of input 28 due to a first speed reduction produced in gear unit 32. With sun gears 54 and 52 held and ring gear 56 driving the third gear unit, carrier 58, ring gear 49, ring gear 48, and output 29 are underdriven relative to the ring gear 56 due to a second speed reduction produced in gear unit 36. With the transmission operating in second gear, the ratio of the speed of input 28 and the speed of output 29 is 2.3404.

An upshift to third gear from second gear results upon disengaging brake 72, and engaging clutch 66, and maintaining clutch 64 engaged. Clutch 66 driveably connects carrier 42 and sun gear 54, and clutch 64 driveably connects carrier 42 and ring gear 56. Because the speeds of sun gears 46, 54 and ring gear 56 are equal and underdriven relative to the speed of input 28, carrier 58, ring gear 49, ring gear 48 and output 29 are underdriven at that same speed due to the speed reduction produced in gear unit 32. With the transmission operating in third gear, the ratio of the speed of input 28 and the speed of output 29 is 1.521.

An upshift to fourth gear from third gear results by maintaining clutch 64 engaged, engaging clutch 68, and disengaging clutch 66. Ring gear 56 of the third gear unit 36 is underdriven through clutch 64 relative to the speed of input 28 due to the speed reduction that occurs in the first gear unit 32. Carrier 50 is driven at the speed of input 28 through clutch 68. Sun gears 46, 54 are secured mutually; therefore, they rotate at the same speed. Similarly carrier 58 and ring gear 49 are secured mutually; therefore, they rotate at the same speed. Ring gear and output 49 are slightly underdriven relative to the speed of input 28 due to the speed reduction produced by the second and third gear units 34, 36 when driveably connect to the input 28 and the underdriven carrier 42 of the first gear unit 32 in this way. With the transmission operating in fourth gear, the ratio of the speed of input 28 and the speed of output 29 is 1.143.

An upshift to fifth gear from fourth gear results upon disengaging clutch 64, engaging clutch 66, and maintaining clutch 68 engaged. With the transmission so disposed, sun gear 46 of the second gear unit 34 is underdriven through clutch 66 relative to the speed of input 28 due to the speed reduction that occurs in the first gear unit 32. Carrier 50 of the second gear unit 34 is driven at the speed of input 28 through clutch 68. Ring gear 48 and output 29 are overdriven relative to the speed of input 28 due to the speed increase and torque reduction that gear unit 34 produces. With the transmission operating in fifth gear, the ratio of the speed of input 28 and the speed of output 29 is 0.867.

An upshift to sixth gear from fifth gear results upon engaging brake 72, disengaging clutch 66, and maintaining clutch 68 engaged. With the transmission so disposed, input 28 is driveably connected to carrier 50 through clutch 68, and sun gear 46 is held against rotation due to engagement of brake 72. The torque reduction and speed increase produced in the second gear unit 34 causes ring gear 48 and output 29 to rotate faster than the speed of input 28. With the transmission operating in sixth gear, the ratio of the speed of input 28 and the speed of output 29 is 0.691.

Reverse gear is produced upon engaging clutch 66 and brake 74 concurrently, and releasing the other friction elements. Carrier 42, the underdriven output of gear unit 32, underdrives sun gear 46 through clutch 66 in a forward direction. With carrier 50 held against rotation, the second gear unit 34 produces a second torque amplification and speed reduction, which further underdrives ring gear 48 and output 29 and reverses the direction of their rotation relative to input 28. With the transmission operating in reverse gear, the ratio of the speed of input 28 and the speed of output 29 is −3.403.

A final drive mechanism and differential mechanism (not shown), driveably connected to output 29, transmit power to the drive wheels of a vehicle, as described and illustrated in U.S. Pat. No. 5,261,862. Preferably, a gear selector lever, controlled by the vehicle operator is used to select the operating ranges of the transmission, by being moved among positions where the various gear ratios are produced automatically and other positions where the gear ratios are produced manually.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A multi-speed automatic transmission comprising:
   an input;
   an output;
   a first clutch, a second clutch, and a third clutch;
   a first power path producing a first speed ratio and including the first clutch and the second clutch;
   a second power path producing a second speed ratio, higher than said first fixed speed ratio, and including the third clutch;
   a first brake associated with the first power path;
   a second brake associated with the second power path;
   a planetary gear system comprising a first and second gear units, each gear unit including a sun gear, a ring gear, planet pinions meshing with the sun gear and the ring gear, and a carrier rotatably supporting the planet pinions, the sun gear of the first gear unit being secured to the sun gear of the second gear unit, a first ring gear of the first gear unit being secured to the output, a second ring gear of the first gear unit being secured to the carrier of the second gear unit;
   the first clutch being operable to connect the ring gear of the second gear unit to the input through said first power path, the second clutch being operable to couple the sun gears to the input through said first power path, the third clutch being operable to couple the carrier of the first gear unit to the input through the second power path, the first brake being operable to hold the carrier of the first gear unit against rotation, and the second brake being operable to hold the sun gears against rotation.

2. The transmission of claim 1 wherein operation in multiple gears is produced by concurrent engagement of two of the first, second and third clutches and the first and second brakes, engagement of the first clutch and of the first brake producing a first forward gear.

3. The transmission of claim 1 wherein operation in multiple gears is produced by concurrent engagement of two of the first, second and third clutches and the first and second brakes, engagement of the first clutch and of the second brake producing a second forward gear.

4. The transmission of claim 1 wherein operation in multiple gears is produced by concurrent engagement of two of the first, second and third clutches and the first and second brakes, engagement of the first clutch and of the second clutch producing a third forward gear.

5. The transmission of claim 1 wherein operation in multiple gears is produced by concurrent engagement of two of the first, second and third clutches and the first and second brakes, engagement of the first clutch and of the second clutch producing a fourth forward gear.

6. The transmission of claim 1 wherein operation in multiple gears is produced by concurrent engagement of two of the first, second and third clutches and the first and second brakes, engagement of the first clutch and of the second clutch producing a fifth forward gear.

7. The transmission of claim 1 wherein operation in multiple gears is produced by concurrent engagement of two of the first, second and third clutches and the first and second brakes, engagement of the third clutch and of the second brake producing a sixth forward gear.

8. The transmission of claim 1 wherein operation in multiple gears is produced by concurrent engagement of two of the first, second and third clutches and the first and second brakes, engagement of the second clutch and of the first brake producing a reverse gear.

9. A multiple-speed transmission comprising:
   an input;
   an output;
   a gear system comprising a first, second and third planetary gear units, each gear unit including a sun gear, a ring gear, planet pinions meshing with the sun gear and the ring gear, and a carrier rotatably supporting the planet pinions, the carrier of the third gear unit being secured to a sun gear the second gear unit for rotation therewith, the output being secured to a sun gear of the second gear unit for rotation therewith;
   a first brake for alternately holding against rotation and releasing the carrier of the second gear unit;

a second brake for alternately holding against rotation and releasing the sun gear of the second gear unit and the sun gear of the third gear unit;

a first clutch for alternately driveably connecting and disconnecting the carrier of the first gear unit and the ring gear of the third gear unit;

a second clutch for alternately driveably disconnecting and connecting the carrier of the first gear unit to the sun gears of the second gear unit and third gear unit; and a third clutch for alternately releasing and driveably connecting the input and ring gear of the first gear unit to the carrier of the second gear unit.

10. The multiple-speed transmission of claim 1 wherein the first gear unit produces a first output whose speed relative to the speed of the input is less than unity, the first output being coupled selectively to the ring gear of the third gear unit through the first clutch.

11. The multiple-speed automatic transmission of claim 1 wherein the first gear unit produces a first output whose speed relative to the speed of the input is less than unity, the first output being coupled selectively to the sun gears of the second and third gear units through the second clutch.

12. The multiple-speed transmission of claim 1 wherein the input is coupled to the carrier of the second gear unit through the third clutch.

13. The multiple-speed transmission of claim 1 wherein:

the first gear unit produces a first output whose speed relative to the speed of the input is less than unity;

the first output is coupled selectively to the ring gear of the third gear unit through the first clutch;

the first output is coupled selectively to the sun gears of the second and third gear units through the second clutch; and the input is coupled to the carrier of the second gear unit through the third clutch.

14. The multiple-speed transmission of claim 1 wherein the second gear unit gear further includes:

a first sun gear secured to the output for rotation therewith;

a second sun gear, spaced from the first sun gear and secured to the carrier of the third gear unit for rotation therewith; and a member secured to the carrier of the second gear unit, extending radially between said first sun gear and said second sun gear, and driveably connected to the third clutch.

* * * * *